(12) United States Patent
Nonaka et al.

(10) Patent No.: US 10,337,398 B2
(45) Date of Patent: Jul. 2, 2019

(54) BLOWBY GAS TREATMENT DEVICE FOR INTERNAL COMBUSTION ENGINE WITH SUPERCHARGER

(71) Applicant: MAHLE FILTER SYSTEMS JAPAN CORPORATION, Tokyo (JP)

(72) Inventors: Atsushi Nonaka, Kawagoe (JP); Daizo Ito, Saitama (JP); Terumoto Mochizuki, Saitama (JP); Akira Iijima, Tokyo (JP); Takayuki Sakai, Sayama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/651,250

(22) Filed: Jul. 17, 2017

(65) Prior Publication Data

US 2018/0066572 A1  Mar. 8, 2018

(30) Foreign Application Priority Data

Sep. 5, 2016 (JP) .................................. 2016-172369

(51) Int. Cl.
*F02D 9/02* (2006.01)
*F01M 13/00* (2006.01)
(Continued)

(52) U.S. Cl.
CPC ........... *F02B 37/127* (2013.01); *F01M 13/00* (2013.01); *F01M 13/022* (2013.01);
(Continued)

(58) Field of Classification Search
CPC .... F02B 37/127; F02B 37/007; F02B 37/005; F01M 13/022; F01M 13/04; F01M 13/00;
(Continued)

(56) References Cited

U.S. PATENT DOCUMENTS

| 2008/0083399 | A1* | 4/2008 | Hirano | ................... F01M 13/02 123/572 |
| 2013/0291843 | A1 | 11/2013 | Kitayama et al. | |
| 2014/0076294 | A1 | 3/2014 | Ulrey et al. | |

FOREIGN PATENT DOCUMENTS

| DE | 10 2009 032 835 A1 | 2/2011 | |
| DE | 102009032835 A1 * | 2/2011 | ........... F01M 13/022 |

(Continued)

OTHER PUBLICATIONS

Extended European Search Report, dated Jan. 26, 2018, 8 pages.

*Primary Examiner* — Jacob M Amick
*Assistant Examiner* — Charles Brauch
(74) *Attorney, Agent, or Firm* — Foley & Lardner LLP (57) ABSTRACT

Disclosed is a blowby gas treatment device for an internal combustion engine with a supercharger, the blowby gas treatment device comprising: a fresh air introduction passage wherein one end of the fresh air introduction passage is connected to an upstream side of the supercharger and the other end is communicated with a crankcase of the internal combustion engine; a first blowby gas passage wherein one end of the first blowby gas passage is connected to a venturi part provided in an upstream side of the supercharger in the intake passage and the other end is communicated with the crankcase; a first check valve being interposed in the fresh air introduction passage and preventing a flow from the crankcase side to the intake passage side; and a second check valve being interposed in the blowby gas passage and preventing a flow from the intake passage side to the crankcase side.

5 Claims, 6 Drawing Sheets

(51) Int. Cl.
*F01M 13/02* (2006.01)
*F01M 13/04* (2006.01)
*F02B 37/00* (2006.01)
*F02B 37/12* (2006.01)
*F02B 37/007* (2006.01)

(52) U.S. Cl.
CPC ........... *F01M 13/04* (2013.01); *F02B 37/005* (2013.01); *F02B 37/007* (2013.01); *F01M 2013/0044* (2013.01); *F01M 2013/027* (2013.01); *F02D 2009/022* (2013.01); *F02D 2009/0205* (2013.01); *F02D 2009/0206* (2013.01); *Y02T 10/144* (2013.01)

(58) Field of Classification Search
CPC ...... F01M 2013/027; F01M 2013/0044; F02D 2009/0206; F02D 2009/0205; F02D 2009/022
See application file for complete search history.

(56) References Cited

FOREIGN PATENT DOCUMENTS

| | | |
|---|---|---|
| DE | 20 2013 104 237 U1 | 10/2013 |
| EP | 2 664 755 A1 | 11/2013 |
| WO | WO-2008/041113 A2 | 4/2008 |
| WO | WO 2013/021456 A1 | 2/2013 |

* cited by examiner

BLOWBY GAS TREATMENT DEVICE FOR INTERNAL COMBUSTION ENGINE WITH SUPERCHARGER

BACKGROUND OF THE INVENTION

The present invention relates to a blowby gas treatment device which returns blowby gas having leaked out to a crankcase of an internal combustion engine to an intake system, and especially relate to a blowby gas treatment device for an internal combustion engine with a supercharger, which is provided with a supercharger in the intake system.

In a gasoline engine, there is a problem that blowby gas having leaked out to a crankcase causes deterioration of a lubricating oil. Therefore, a blowby gas treatment device which introduces fresh air into the crankcase and which takes the blowby gas out from the crankcase and returns the blowby gas to an intake system has been used.

The blowby gas treatment device conventionally has structures where a fresh gas passage is provided between an upstream side of a throttle valve in an intake system and a cylinder head of the engine body, where a blowby gas passage is provided between a downstream side of the throttle valve in the intake system and a crankcase, and where a flow control valve (that is to say, PCV valve) changing in a valve opening depending on negative pressure in the downstream side of the throttle valve is provided on the blowby gas passage. In this device, as sufficient negative pressure occurs in the intake system in the downstream side of the throttle valve under an usual operating condition other than a high load region, fresh air is introduced into the crankcase from the fresh air passage through the cylinder head. Furthermore, blowby gas is returned to the intake system in the downstream side of the throttle valve through the blowby gas passage and led to a combustion chamber so as to be pushed out by the fresh air.

Regarding such a conventional blowby gas treatment device, in case of an internal combustion engine provided with a supercharger in an upstream side of a throttle valve of an intake passage, it is impossible to conduct the blowby gas treatment because a downstream of the throttle also has positive pressure in the supercharging region.

Patent Document 1 (WO 2013/021456 A1) discloses a blowby gas treatment device for an internal combustion engine with a supercharger where blowby gas treatment is conducted in a supercharging region. This device includes a bypass passage provided between a downstream side of a throttle valve in an intake passage and an upstream side of a supercharger; and an ejector pump provided in the bypass passage. The ejector pump uses an inspiratory flow returning from the downstream side of the throttle valve to the upstream side of the supercharger as a working fluid. Furthermore, in the device, a top of PCV passage which is connected with a cylinder head cover through a PCV valve is connected with an intake port of the ejector pump. Therefore, a part of intake air is returned from the downstream side of the throttle valve having positive pressure to the upstream side of the supercharger through the bypass passage. Due to this flow, blowby gas is absorbed by the operation of the ejector pump.

SUMMARY OF THE INVENTION

However, in the above structure, a part of the intake air is returned to the upstream side of the supercharger in order to absorb the blowby gas, so supercharge efficiency of the supercharger is reduced. Thereby, that causes a deterioration of fuel consumption rate, and intake air temperature is unnecessarily raised. Furthermore, the structure tends to be complicated as the ejector pump is required.

It is an object of the present invention to provide a blowby gas treatment device for an internal combustion engine with a supercharger without an ejector pump and returning supercharged gas.

According to one aspect of the present invention, a blowby gas treatment device for an internal combustion engine with a supercharger, the internal combustion engine provided with a supercharger in an upstream side of a throttle valve in an intake passage, the blowby gas treatment device comprises:

a fresh air introduction passage wherein one end of the fresh air introduction passage is connected to an upstream side of the supercharger and the other end of the fresh air introduction passage is communicated with a crankcase of the internal combustion engine;

a first blowby gas passage wherein one end of the first blowby gas passage is connected to a venturi part provided in an upstream side of the supercharger in the intake passage and the other end of the first blowby gas passage is communicated with the crankcase;

a first check valve being interposed in the fresh air introduction passage and preventing a flow from the crankcase side to the intake passage side; and a second check valve being interposed in the first blowby gas passage and preventing a flow from the intake passage side to the crankcase side.

Advantageous Effects of the Invention

Although both of the one end of the fresh air introduction passage and the one end of the first blowby gas passage are connected to the upstream side of the supercharger in the intake passage, the one end of the first blowby gas passage is connected to the venturi part provided in the intake passage. Therefore, when the intake air flows at high speed in a supercharging region, by a pressure lowering effect in the venturi part, pressure affecting the one end of the blowby gas passage gets relatively lower than pressure affecting the one end of the fresh air introduction passage.

Therefore, in the supercharging region, by the pressure difference between the one end of the fresh air introduction passage and the one end of the blowby gas passage, fresh air is introduced into the crankcase from the intake passage through the fresh air introduction passage. In parallel with this, blowby gas is taken out from the crankcase to the intake passage through the blowby gas passage. Finally, the blowby gas is led to a combustion chamber with the intake air.

The fresh air introduction passage and the blowby gas passage each have the check valve, which lets only a flow in the prescribed direction pass. Therefore, a backward flow when the pressure difference is insufficient is certainly prevented.

According to the present invention, it is possible to conduct a blowby gas treatment in a supercharging region. Furthermore, returning of supercharged gas and an ejector pump aren't required unlike a conventional device. Therefore, the present invention can avoid problems of performance deterioration of a supercharger, etc., and its structure can be simple.

DETAILED DESCRIPTION OF THE INVENTION

Hereinafter, one embodiment of the present invention will be explained in detail based on the figures.

Figure 1:
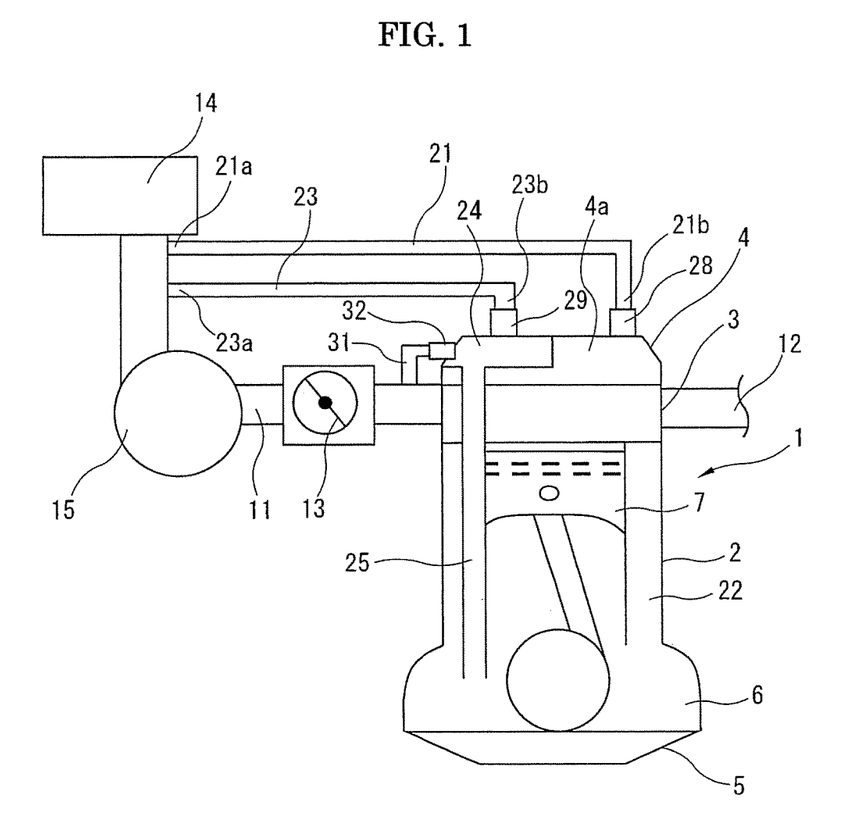
FIG. 1 is a structural explanatory drawing of an internal combustion engine with a supercharger having a blowby gas treatment device in the first embodiment according to the present invention.

FIG. 1 is a structural explanatory drawing showing an entire structure of a blowby gas treatment device in the first embodiment where this invention is used in an automotive gasoline engine as an internal combustion engine 1. The internal combustion engine 1 is equipped with a cylinder block 2, a cylinder head 3, a cylinder head cover 4, and an oil pan 5. The cylinder block 2 and oil pan 5 constitute a crankcase 6. Unburnt gas (partially including burnt gas) leaking out from a combustion chamber to the crankcase 6 through a clearance surrounding a piston 7 is so-called blowby gas.

The cylinder head 3 is connected with an intake passage 11 which is continuous to an intake port; and an exhaust passage 12 which is continuous to an exhaust port. In the intake passage 11, an electronic control throttle valve 13 where a valve opening is controlled by an actuator such as an electric motor is interposed, and in an upstream side in the intake passage 11, an air cleaner 14 is provided. Furthermore, a supercharger 15 is interposed between the throttle valve 13 and the air cleaner 14. In one embodiment, the supercharger 15 is a turbo supercharger, for detail, that is a compressor driven by an exhaust turbine (not shown) in the exhaust passage 12. Furthermore, a mechanical supercharger, which is driven by an output of the internal combustion engine 1 or by the electric motor, etc., can be used. An inter-cooler can be provided in a downstream side of the supercharger 15 (upstream or downstream side of the throttle valve 13) in the intake passage 11. The inter-cooler cools an intake air which has gotten high temperature due to supercharging.

In an upstream side of the supercharger 15 in the intake passage 11, one end 21a of a fresh air introduction passage 21 is connected therewith. The other end 21b of the fresh air introduction passage 21 is connected with the cylinder head cover 4. A space 4a which is in the cylinder head cover 4 with which the fresh air introduction passage 21 connected communicates with the crankcase 6 through an internal passage 22 having an oil drop hole for a lubricating oil in the internal combustion engine 1, a chain passage, etc.

Furthermore, one end 23a of a first blowby gas passage 23 is connected to the upstream side of the supercharger 15 in the intake passage 11 in order to take blowby gas out from the crankcase 6 in a supercharging region. The other end 23b of the first blowby gas passage 23 is connected with the cylinder head cover 4, for detail, that is connected with an outlet port of an oil mist separator 24 provided inside the cylinder head cover 4. An inlet port of the oil mist separator 24 is constituted as a gas port passage 25 into a pipeline shape extending in a vertical direction through the cylinder head 3 and the cylinder block 2, and the inlet port communicates with the crankcase 6.

In the fresh air introduction passage 21, a check valve 28 for the fresh air introduction passage is interposed. The check valve 28 lets only a flow of fresh air heading toward a side of the cylinder head cover 4 from a side of the intake passage 11 pass and prevents a flow of the blowby gas toward the opposite direction. In one embodiment, the check valve 28 for the fresh air introduction passage is disposed at a connection part of the fresh air introduction passage 21 to the cylinder head cover 4.

In the first blowby gas passage 23, a check valve 29 for the blowby gas passage is interposed. The check valve 29 lets only a flow of blowby gas heading toward the side of the intake passage 11 from the side of the cylinder head cover 4 pass and prevents a flow of the fresh air toward the opposite direction. In one embodiment, the check valve 29 for the blowby gas passage is disposed at a connection part of the blowby gas passage 23 to the cylinder head cover 4 (oil mist separator 24).

Furthermore, a second blowby gas passage 31 is provided between the cylinder head cover 4 and the intake passage 11 in order to take the blowby gas out from the crankcase 6 in the non-supercharging region. Regarding the second blowby gas passage 31, one end of the second blowby passage 31 is connected to a downstream side of the throttle valve 13 in the intake passage 11, and the other end of the second blowby gas passage 31 is connected to an outlet side of the oil mist separator 24 in the cylinder head cover 4. In the second blowby gas passage 31, a flow control valve 32 (what is called PCV valve) changing in a valve opening depending on a negative pressure in the side of the intake passage 11 (for detail, a pressure difference between forward and behind sides of the flow control valve 32) is interposed. Concretely, the flow control valve 32 is disposed at a connection part of the second blowby gas passage 31 to the cylinder head cover 4.

Figure 2:
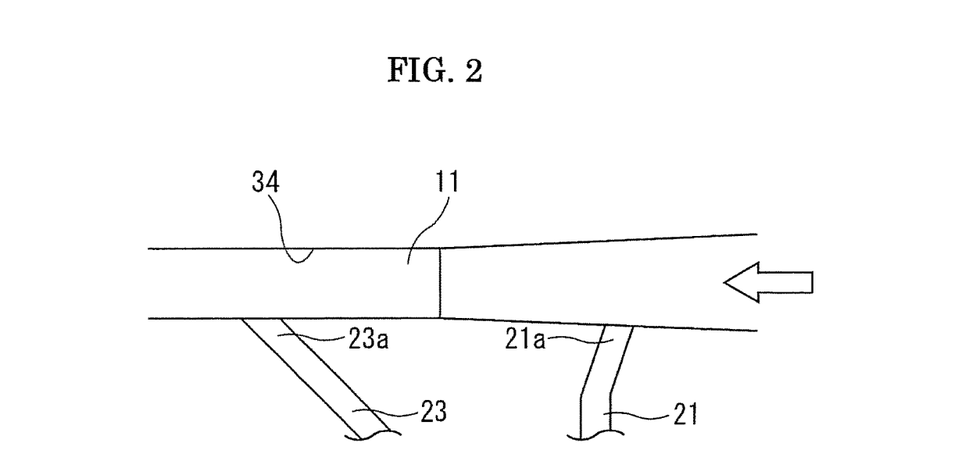
FIG. 2 is a cross-sectional explanatory drawing showing a structure of a main part of an intake passage.

FIG. 2 shows a structure of an upstream side of the supercharger 15 in the intake passage 11 where each of one end 21a of the fresh air introduction passage 21 and one end 23a of the first blowby gas passage 23 is connected. As shown in FIG. 2, the fresh air introduction passage 21 is connected at a position in a relative upstream side in the intake passage 11, and the first blowby gas passage 23 is connected at a position in a relative downstream side in the intake passage 11. In the intake passage 11, a part where one end 23a of the first blowby gas passage 23 is opened is constructed as a venturi part 34 whose diameter (passage section area) is relatively small as compared with a diameter of a part where one end 21a of the fresh air introduction passage 21 is opened. That is, the intake passage 11 gradually gets smaller in its diameter from the upstream side, and the venturi part 34 of the intake passage 11 has the minimum passage section area. The first blowby gas passage 23 is connected with the venturi part 34. Furthermore, the intake passage 11 may be connected with the supercharger 15 with the passage section area made to expand again in the downstream side (not shown) or may be connected with the supercharger 15 while maintaining the minimum passage section area in the venturi part 34.

In the venturi part 34, as the diameter is reduced, flow velocity of the intake air is increased, and pressure is reduced. Therefore, in case of comparing pressure in one end 21a of the fresh air introduction passage 21 with pressure in one end 23a of the first blowby gas passage 23 when the flow velocity in the intake passage 11 is high speed, the pressure in one end 23a of the first blowby gas passage 23 is relatively lower. Therefore, a pressure difference between the two is caused.

Furthermore, in the present invention, the one end 21a of the fresh air introduction passage 21 may be placed in a downstream side with respect to the one end 23a of the first blowby gas passage 23 in the intake passage 11. However, in case that the one end 21a of the fresh air introduction passage 21 may be placed in a downstream side with respect to the one end 23a of the first blowby gas passage 23, a part of the blowby gas having run out from the first blowby gas passage 23 to the intake passage 11 runs out to the fresh air introduction passage 21. Therefore, as the embodiment shown in FIG. 2, it is desirable that the one end 21a of the fresh air introduction passage 21 is placed at the upstream side with respect to the one end 23a of the first blowby gas passage 23.

Figure 3:
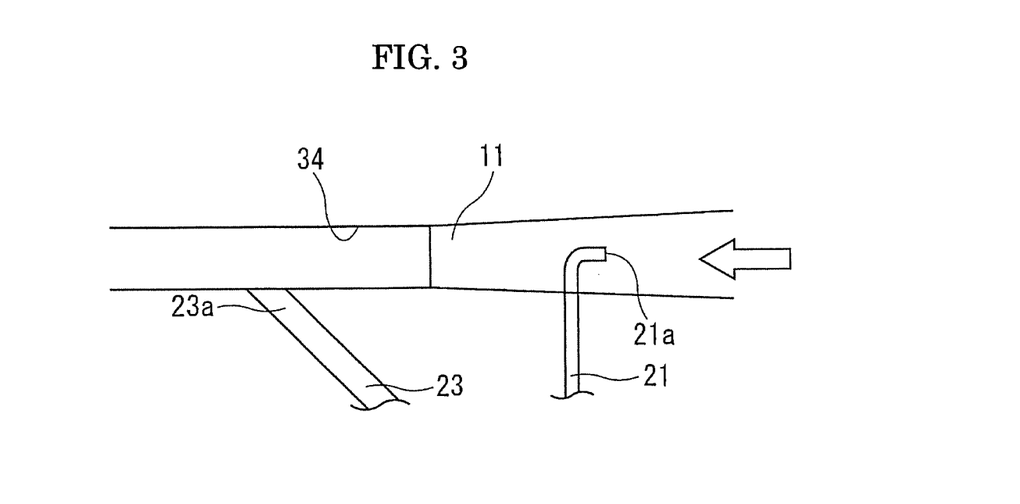
FIG. 3 is a cross-sectional explanatory drawing showing a variation of a structure in a top of a fresh air introduction passage.

Furthermore, as shown in FIG. 3, the one end 21a of the fresh air introduction passage 21 may be constituted so as to be projected inside the intake passage 11 as a metal pipe, etc. and so as to be opened facing to the flow of the intake passage 11 by bending the one end 21a to the upstream side. According to such a structure, dynamic pressure due to the flow of intake air affects the fresh air introduction passage 21, and thereby the pressure difference between the fresh air introduction passage 21 and the first blowby gas passage 23 is further expanded.

Figure 4:
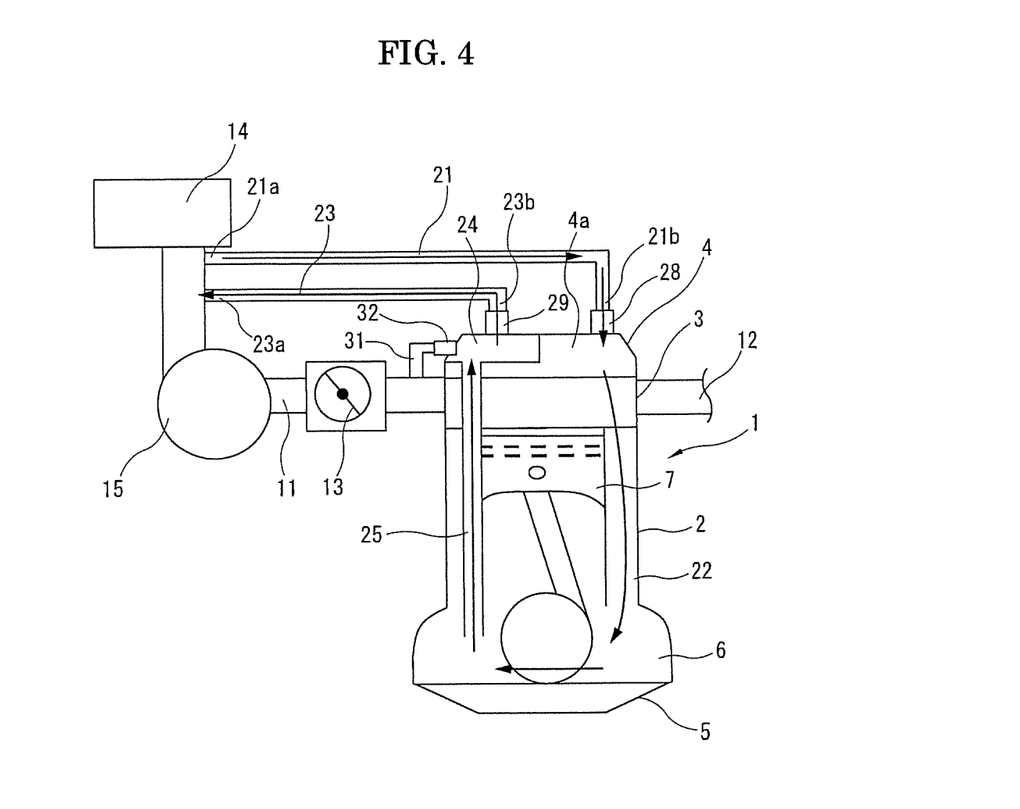
FIG. 4 is an explanatory drawing showing a flow of gas in a supercharging region in the first embodiment.
Figure 5:
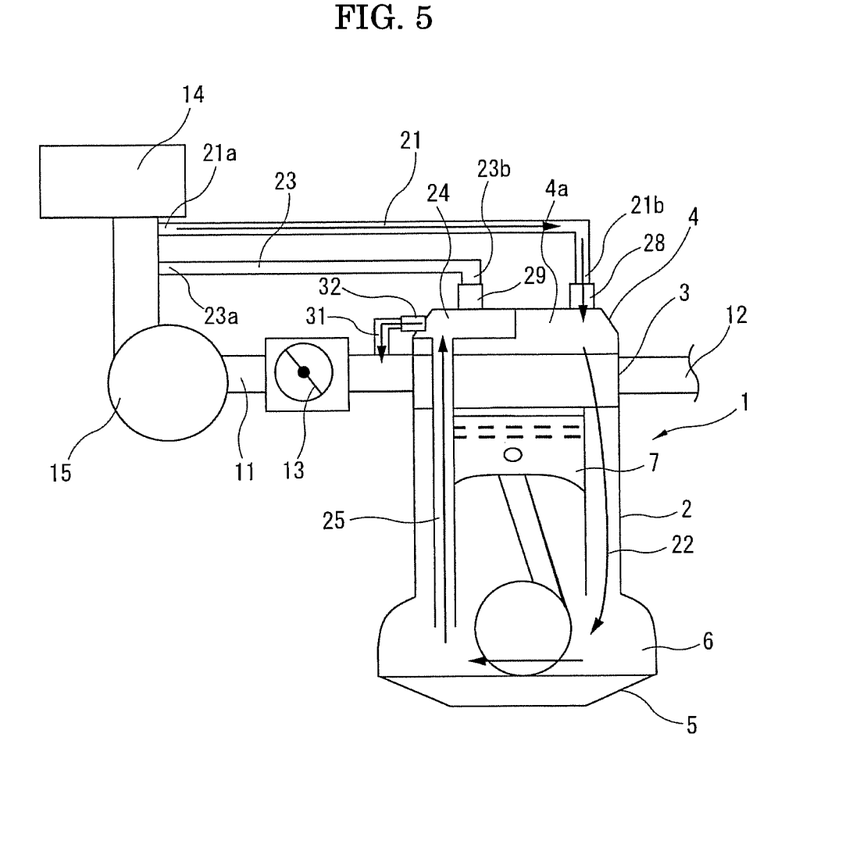
FIG. 5 is an explanatory drawing showing a flow of gas in a non-supercharging region in the first embodiment.

FIG. 4 and FIG. 5 are explanatory drawings showing a flow of gas in the above structure. In the supercharging region of the internal combustion engine 1, a large quantity of the intake air flows at a high speed in the intake passage 11 in the upstream side of the supercharger 15. Therefore, as mentioned above, the pressure difference is caused between the one end 21a of the fresh air introduction passage 21 and the one end 23a of the first blowby gas passage 23. Therefore, as indicated by the arrow in FIG. 4, the fresh air flows from the intake passage 11 to the side of the cylinder head cover 4 through the fresh air introduction passage 21, and the fresh air is introduced into the crankcase 6. Thereby, the inside of the crankcase 6 is ventilated. Furthermore, the blowby gas having run out from the combustion chamber to the inside of the crankcase 6 flows from a gas port passage 25 to the first blowby gas passage 23 through the oil mist separator 24, and then, flows to the intake passage 11 through the first blowby gas passage 23. Finally, the blowby gas is returned to the combustion chamber and burned there.

Each of the fresh air introduction passage 21 and the first blowby gas passage 23 is equipped with each of check valves 28 and 29, which prevent a backward flow. Therefore, even if the pressure in the crankcase 6 transitionally changes, the backward flow isn't caused and only the flow of the direction indicated in FIG. 4 is caused. That is, even if the pressure in the crankcase 6 transitionally changes, the fresh air is introduced when pressure in one end 21a of the fresh air introduction passage 21 is relatively higher than the pressure in the crankcase 6, and the blowby gas is discharged when the pressure in the crankcase 6 is relatively higher than pressure in one end 23a of the first blowby gas passage 23.

In the supercharging region, the intake passage 11 in a downstream side of a throttle valve 13 with which the second blowby gas passage 31 communicates also has positive pressure, so the blowby gas isn't discharged through the second blowby gas passage 31. Furthermore, an opening degree of the flow control valve 32 becomes zero, so an inflow of the fresh air through the second blowby gas passage 31 (that is, backward flow) also isn't caused.

On the other hand, in the non-supercharging region of the internal combustion engine 1, pressure in the intake passage 11 in the downstream side of the throttle valve 13 has a negative pressure, so flows of the fresh air and the blowby gas as shown in FIG. 5 are caused by a pressure difference between the downstream side of the throttle valve 13 and the upstream side of the supercharger 15. That is, the blowby gas inside the crankcase 6 passes the gas port passage 25 and the oil mist separator 24 and is introduced to the downstream side of the throttle valve 13 of the intake passage 11 through the second blowby gas passage 31. At the same time, the fresh air is introduced from the upstream side of the supercharger 15 in the intake passage 11 to the crankcase 6 through the fresh air introduction passage 21, and thereby the inside of the crankcase 6 is ventilated. A flow amount of the blowby gas flowing in the second blowby gas passage 31 is adjusted by the flow control valve 32 depending on a pressure difference between front and behind sides of the flow control valve 32. Furthermore, in the non-supercharging region, as flow velocity in the intake passage 11 is relative low in the upstream side of the supercharger 15, pressure lowering in one end 23a of the first blowby gas passage 23 is relatively weak. That is, the pressure in the one end 23a of the first blowby gas passage 23 is high as compared with pressure in the downstream side of the throttle valve 13. Therefore, a flow of the blowby gas through the first blowby gas passage 23 is scarcely caused.

In this manner, according to the above embodiment, it is possible to take the blowby gas out from the crankcase 6 and to introduce the fresh air into the crankcase 6 in the supercharging region by using a pressure difference between the fresh air introduction passage 21 and the first blowby gas passage 23, the pressure difference being generated by high speed intake air flow in the intake passage 11. Therefore, in an internal combustion engine 1 supercharging in a wide driving region (for example, downsizing turbo engine), it is possible to more surely perform the treatment of blowby gas. Furthermore, as the fresh air is taken out in the upstream side of the supercharger 15, the supercharging air isn't wasted unlike a conventional device using an ejector pump.

Furthermore, in the above embodiment, the blowby gas treatment can be conducted with a use of the second blowby gas passage 31 also in the non-supercharging region. That is, the blowby gas treatment can be conducted in both of the supercharging region and the non-supercharging region.

Furthermore, the second blowby gas passage 31 may be omitted because generally the generation amount of the blowby gas is larger in the supercharging region.

Figure 6:
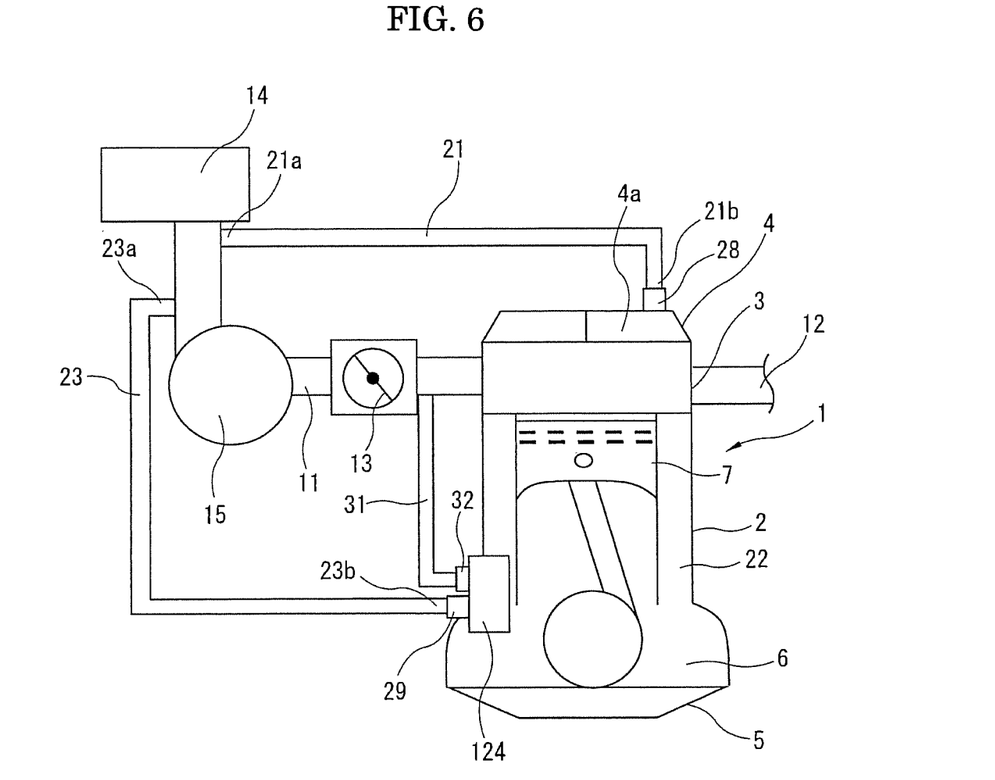
FIG. 6 is a structural explanatory drawing of an internal combustion engine with a supercharger having a blowby gas treatment device in the second embodiment.

Next, FIG. 6 shows the second embodiment in the present invention. In this second embodiment, an oil mist separator 124 is disposed in a side part of the cylinder block 2, and an inlet port of the oil mist separator 124 directly communicates with the crankcase 6. The end part 23b of the first blowby gas passage 23 is connected to an outlet side of the oil mist separator 124 through the check valve 29 for the blowby gas passage. In the same manner, the end part of the second blowby gas passage 31 is connected to the outlet side of the oil mist separator 124 through the flow control valve 32 (PCV valve).

Figure 7:
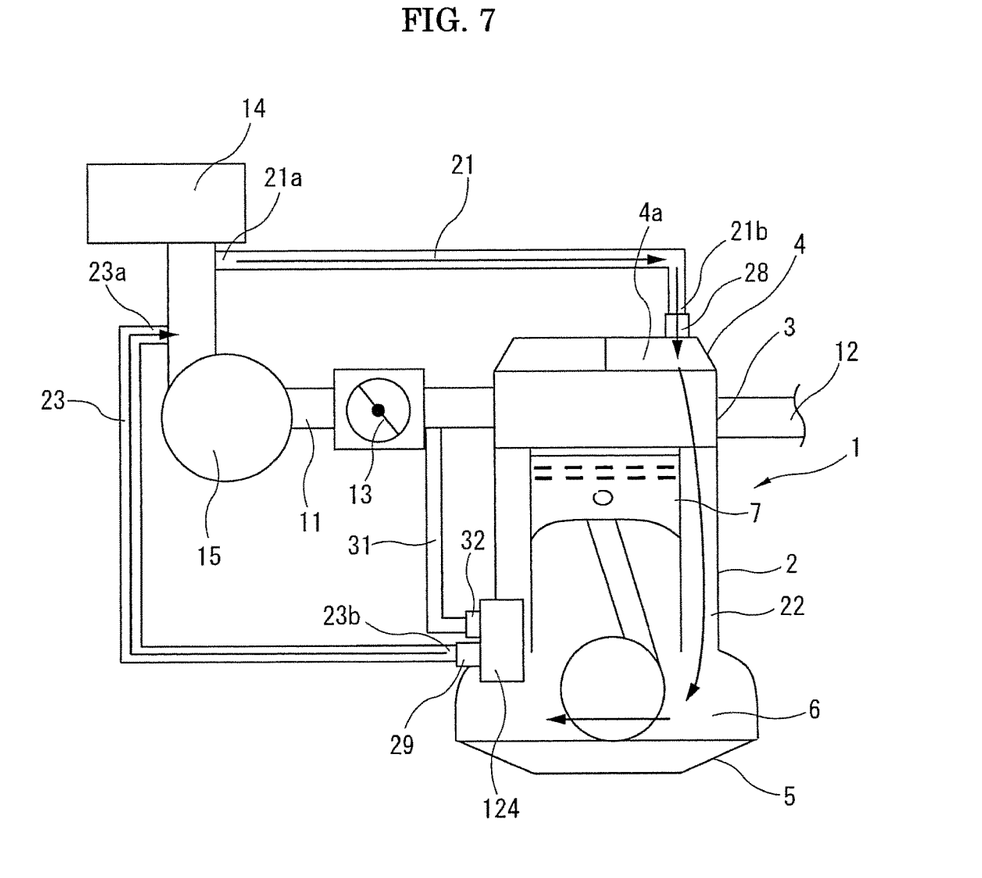
FIG. 7 is an explanatory drawing showing a flow of gas in a supercharging region in the second embodiment.

FIG. 7 shows a flow of gas in the supercharging region in the second embodiment. As with the above-described first embodiment, by using a pressure difference generated in the intake passage 11 in the upstream of the supercharger 15, fresh air is introduced into the crankcase 6 through the fresh air introduction passage 21, and blowby gas is taken out from the crankcase 6 through the first blowby gas passage 23.

Figure 8:
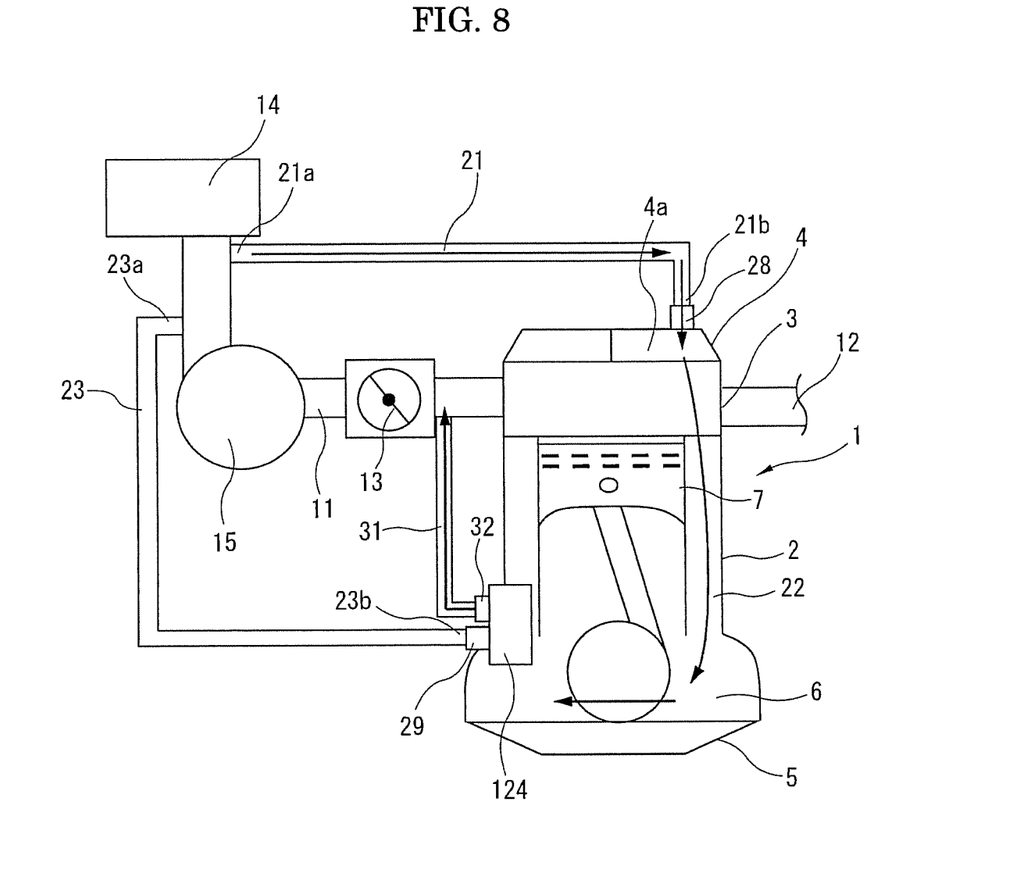
FIG. 8 is an explanatory drawing showing a flow of gas in a non-supercharging region in the second embodiment.

FIG. 8 show a flow of gas in the non-supercharging region. Also as with the above-described first embodiment, by using a negative pressure in the downstream side of the throttle valve 13, blowby gas is taken out from the crankcase 6 through the second blowby gas passage 31, and fresh air is introduced into the crankcase 6 through the fresh air introduction passage 21.

As one preferable aspect of the present invention, the fresh air introduction passage is connected with a cylinder head cover of the internal combustion engine and communicated with the crankcase through an inner space of the cylinder head cover.

As another preferable aspect of the present invention, the first blowby gas passage is connected with the cylinder head cover of the internal combustion engine and communicated with the crankcase through an oil mist separator provided in an inside of the cylinder head cover.

As another preferable aspect of the present invention, the first blowby gas passage is communicated with the crankcase through an oil mist separator provided on a side part of a cylinder block.

Furthermore, as another preferable aspect of the present invention, the blowby gas treatment device further comprises:

a second blowby gas passage wherein one end of the second blowby gas passage is connected to a downstream side of the throttle valve and the other end of the second blowby gas passage is communicated with the crankcase; and a flow control valve being interposed in the second blowby gas passage and changing in a valve opening depending on a pressure difference between front and behind sides of the flow control valve.

By the second blowby gas passage, it is possible to conduct a blowby gas treatment in a non-supercharging region. That is, in the non-supercharging region, a negative pressure occurs in a downstream side of the throttle valve, so the blowby gas is taken out to the downstream side of the throttle valve in the intake passage through the second blowby gas passage and the flow control valve by the negative pressure. In parallel with this, fresh air is introduced into the crankcase through the fresh air introduction passage because an upstream side of the supercharger in the intake passage has a pressure close to atmospheric pressure.

The entire contents of Japanese Patent Application No. 2016-172369 filed Sep. 5, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A blowby gas treatment device for an internal combustion engine with a supercharger, the internal combustion engine provided with a supercharger in an upstream side of a throttle valve in an intake passage, the blowby gas treatment device comprising:

a fresh air introduction passage, wherein one end of the fresh air introduction passage is connected to an upstream side of the supercharger and another end of the fresh air introduction passage is communicated with a crankcase of the internal combustion engine;

a first blowby gas passage, wherein one end of the first blowby gas passage is connected to a venturi part provided in the upstream side of the supercharger in the intake passage and another end of the first blowby gas passage is communicated with the crankcase;

a first check valve being interposed in the fresh air introduction passage and structured to prevent a flow from a crankcase side to an intake passage side; and a second check valve being interposed in the first blowby gas passage and structured to prevent a flow from the intake passage side to the crankcase side.

2. The blowby gas treatment device for the internal combustion engine with the supercharger as claimed in claim 1, wherein the fresh air introduction passage is connected with a cylinder head cover of the internal combustion engine and communicated with the crankcase through an inner space of the cylinder head cover.

3. The blowby gas treatment device for the internal combustion engine with the supercharger as claimed in claim 1, wherein the first blowby gas passage is connected with a cylinder head cover of the internal combustion engine and communicated with the crankcase through an oil mist separator provided inside the cylinder head cover.

4. The blowby gas treatment device for the internal combustion engine with the supercharger as claimed in claim 1, wherein the first blowby gas passage is communicated with the crankcase through an oil mist separator provided on a side part of a cylinder block.

5. The blowby gas treatment device for the internal combustion engine with the supercharger as claimed in claim 1, wherein the blowby gas treatment device further comprises:

a second blowby gas passage wherein one end of the second blowby gas passage is connected to a downstream side of the throttle valve and another end of the second blowby gas passage is communicated with the crankcase; and a flow control valve being interposed in the second blowby gas passage and being adjustable in opening such that opening of the valve changes responsive to a pressure difference between front and rear sides of the flow control valve.

* * * * *